(12) United States Patent
Ayres et al.

(10) Patent No.: US 6,317,037 B1
(45) Date of Patent: Nov. 13, 2001

(54) VIRTUAL INSTRUMENT PANEL

(75) Inventors: Craig A. Ayres, Lapeer; Douglas Hall, Clarkston, both of MI (US)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 09/185,081

(22) Filed: Nov. 3, 1998

Related U.S. Application Data

(60) Provisional application No. 60/064,021, filed on Nov. 3, 1997.

(51) Int. Cl.[7] .................................................. B60Q 1/00
(52) U.S. Cl. .............................. 340/461; 340/459; 345/7; 359/630
(58) Field of Search ................... 340/459, 461, 340/462; 345/7; 359/630, 631, 632

(56) References Cited

U.S. PATENT DOCUMENTS

| 2,886,911 | 5/1959 | Hardesty . |
| 3,267,598 | 8/1966 | Olesen et al. . |
| 4,257,084 | 3/1981 | Reynolds . |
| 4,258,643 | 3/1981 | Ishikawa et al. . |
| 4,635,033 | * 1/1987 | Inukai et al. ........................ 353/14 |
| 4,636,782 | 1/1987 | Nakamura et al. .................. 340/705 |
| 4,831,366 | 5/1989 | Iino . |
| 4,882,659 | 11/1989 | Gloudemans . |
| 4,884,058 | 11/1989 | Ide . |
| 4,885,663 | 12/1989 | Parker . |
| 4,890,027 | 12/1989 | Bohner et al. . |
| 4,907,132 | 3/1990 | Parker . |
| 4,919,517 | * 4/1990 | Jost et al. .............................. 359/630 |
| 4,939,675 | 7/1990 | Luitie . |
| 4,959,759 | 9/1990 | Kohler . |
| 4,972,122 | 11/1990 | Daidouji et al. . |
| 4,978,214 | * 12/1990 | Kawata ................................ 353/114 |
| 4,988,944 | 1/1991 | Ito et al. . |
| 4,991,064 | 2/1991 | Clem . |
| 5,003,433 | 3/1991 | Fournier . |
| 5,013,947 | 5/1991 | Ide . |
| 5,048,927 | * 9/1991 | Inoue et al. ......................... 359/618 |
| 5,053,755 | * 10/1991 | Smith et al. ............................. 345/7 |
| 5,121,099 | * 6/1992 | Hegedusch ........................... 128/844 |
| 5,284,108 | * 2/1994 | Furuya ................................. 116/286 |
| 5,418,651 | * 5/1995 | Iino et al. ............................ 359/857 |
| 5,461,361 | * 10/1995 | Moore ................................. 340/461 |
| 5,582,129 | * 12/1996 | Furuya ................................. 116/284 |
| 5,731,903 | * 3/1998 | Cook ................................... 359/633 |
| 5,734,358 | * 3/1998 | Sumiyoshi et al. ...................... 345/7 |
| 5,821,867 | 10/1998 | Angell .............................. 340/815.45 |

* cited by examiner

*Primary Examiner*—Edward Lefkowitz
(74) *Attorney, Agent, or Firm*—Clark Hill PC

(57) ABSTRACT

An instrument panel having easy-to-read instruments is disclosed and which in certain embodiments allows for more efficient use of space behind the instrument panel by providing a partially reflective screen in the instrument panel and mounting certain instruments or instrument elements in the brow of the dashboard over and in front of the screen so that images of the instruments or elements in the brow are reflected off the screen. Other instruments or instrument elements may be located behind the screen, and from a viewing location, the instruments or elements combine into an integral display.

11 Claims, 5 Drawing Sheets

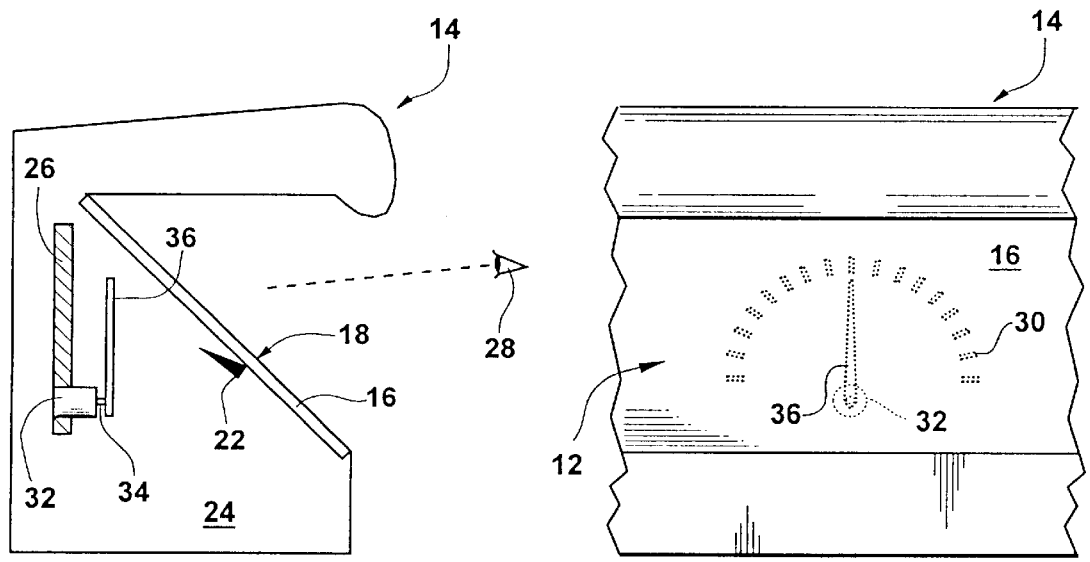
FIG - 9    FIG - 10
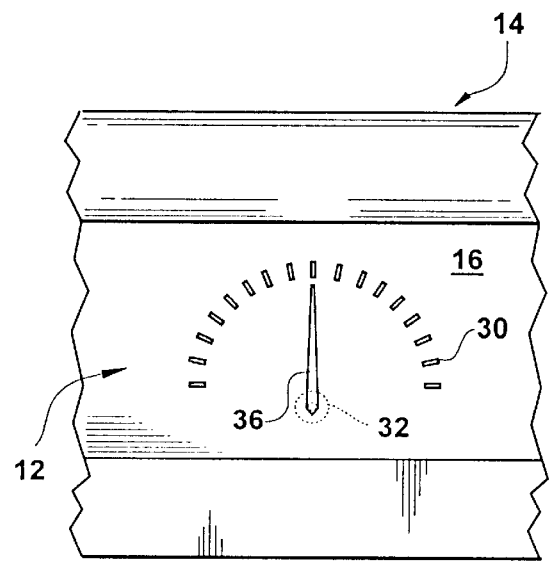
FIG - 11

VIRTUAL INSTRUMENT PANEL

The present application is a continuation of U.S. Provisional Patent Application No. 60/064,021 filed Nov. 3, 1997, and priority based on this earlier filed application is claimed herein.

FIELD OF THE INVENTION

The present invention is directed toward an instrument panel for use in a motor vehicle, and more specifically, toward an instrument panel having a sharp, easy-to-read display.

BACKGROUND OF THE INVENTION

Vehicle instrument panels are generally located behind the steering wheel of a motor vehicle and include a number of gauges or other displays for providing a driver with information about vehicle conditions. Many of these instruments include a background display with markings relevant to a condition being monitored and a pointer that turns to point to various ones of the markings based on information provided to the pointer by a sensor. For example, if the condition being monitored is vehicle speed, the markings on the background will indicate rate of speed in miles or kilometers per hour, and the pointer will turn to point at various ones of these rates based on information provided by a speed sensor. Generally, such instruments include a gauge motor having a rotary output shaft that can be rotated by the motor. A pointer is connected to the rotary output shaft so that it can be made to point in any direction by controlling the gauge motor. When the sensor indicates a certain rate of speed, for example, it provides this information to a controller which in turn causes the gauge motor to position the pointer point to the appropriate background marking.

Viewing these instruments while driving requires a driver to take his eyes off the road for a certain period of time, focus on the instruments, interpret the information provided, and then return his gaze to the road. If the instruments are not easy to read and logically arranged, it will be difficult to read them quickly and accurately, and therefore, the driver will spend a disproportionate amount of time looking at the instruments instead of the road. It is therefore important that the information on the instrument panel be highly visible and easy to read.

The instruments that are consulted most frequently, such as the speedometer and the tachometer, are generally located directly in front of a driver on the instrument panel. These instruments must be large enough to be read quickly, yet compact enough to physically fit in the limited space available in the small panel area immediately in front of the driver. Because of the size of the components behind the dashboard display area, it may also be necessary to space the instruments further apart than would be optimal for layout purposes, resulting in wasted space as viewed from the viewing position of the driver. The area behind the instrument panel also contains other important vehicle components, such as air vents, structural members, and other electrical components which must fit into this limited space. Great care must be taken, therefore, when designing the layout of an instrument panel to provide an easily readable display of information necessary to a driver while leaving adequate space for the other vehicle components. In addition, the more tightly the various components are packed behind the display, the more time will be required for proper assembly, leading to increased assembly and later maintenance costs. It would therefore be desirable to provide an easy-to-read vehicle display that consumed less of the valuable room behind the instrument panel than current displays and that allowed the displays of different instruments to be placed in close proximity to one another.

SUMMARY OF THE INVENTION

These problems and others are addressed by the present invention which comprises a compact and easy-to-read instrument display in which various instruments or elements of instruments appear on the instrument panel as images of remotely located devices. In this manner, a bulky instrument or instrument element may be physically removed from behind the instrument panel to make room for other devices, yet still appear to be located on the instrument panel through the projection of its image thereupon. In a preferred embodiment of the invention, an instrument comprising a background display element and a pointer element for pointing to various portions of the background display element are used. The pointer element includes a gauge motor having a rotary output shaft with a pointer supported and rotated by the shaft. The background display element is located behind a partially reflective screen or combiner in front of an instrument panel, and the pointer and gauge are located beneath the brow of the dashboard, generally above and in front of the combiner. Both elements are illuminated. Because the combiner is only partially reflective, some light can pass through it in either direction without being reflected. Therefore, the background display can be seen through the combiner from the driver's viewing location, and at the same time, the reflection of the pointer can also be seen reflected in the combiner which combines the two images into one. The background display and the pointer are arranged so that the image of the pointer is superimposed over the background display. This results in the creation of a virtual instrument comprising the pointer and the background display which appears to be located entirely on or behind the combiner in front of the driver. The image of the pointer will appear to stand apart from the background display producing a somewhat three-dimensional affect and making the display easier to read. In a second embodiment of the invention, the background display is located in the brow of the dashboard and the pointer is located behind the partially reflective combiner to produce a similar effect.

In a third embodiment of the invention, both the pointer and the background display of an instrument are located beneath the brow of the dashboard, and their image is viewable in the partially reflective combiner. This arrangement frees up a large amount of room behind the instrument panel and still provides an easy-to-read instrument that stands out from the black background behind the partially reflective combiner. In another aspect of this embodiment, a second illuminated instrument is placed behind the partially reflective combiner and the image of the first instrument is superimposed over the second instrument. In this manner an instrument such as an odometer, for example, can be made to appear on the face of a second instrument, such as a speedometer, even though it would not be practical to physically mount the odometer in such close proximity to the speedometer because of the space normally occupied behind the panel by the speedometer gauge motor. One or more gauge-based instruments could also be made to appear on the face of another gauge-based instrument, even thought this too would be difficult to accomplish if all the instruments were physically located behind the face of the instrument panel.

In a fourth embodiment of the invention, the easy-to-read appearance of the instruments of the previous embodiments can be simulated by placing both the background display and the pointer of an instrument behind a partially reflective screen which functions as a dead-front lens so that the instrument is not visible until illuminated by a source of light. In this manner, a vehicle can be equipped with an instrument panel having some of the advantages of the panels described above at a much lower cost and that can be installed in a more conventional manner.

It is therefore a primary object of the present invention to provide a vehicle instrument panel having easy-to-read instruments.

It is another object of the present invention to provide an instrument panel having at least one instrument wherein some elements of the instrument are located remotely from the instrument panel.

It is a further object of the present invention to provide an instrument panel wherein an image of an instrument or instrument element is projected on a partially reflective screen on the instrument panel.

It is still another object of the invention to provide an instrument panel wherein the image of a first instrument or instrument element is superimposed over a second instrument.

It is still a further object of the invention to provide an instrument panel wherein the image of a first instrument or instrument element is superimposed over the image of a second instrument or instrument element.

It is yet another object of the invention to provide an instrument panel having an instrument or instrument element mounted behind a partially reflective combiner to produce a three dimensional appearance.

BRIEF DESCRIPTION OF THE DRAWINGS

These and other objects of the invention will become apparent from a reading and understanding of the following detailed description of several preferred embodiments of the invention, together with the following drawings of which:

FIG. 9 is a side elevational view of a fourth embodiment of the subject invention in which an instrument is located behind a partially reflective screen in an instrument panel;

FIG. 10 is a front elevational view of the instrument panel of FIG. 9 showing the appearance of the panel when the instrument is not illuminated;

FIG. 11 is a front elevational view of the instrument panel of FIG. 9 showing the appearance of the panel when the instrument is illuminated.

DETAILED DESCRIPTION OF THE PREFERRED EMBODIMENTS

Figure 1:
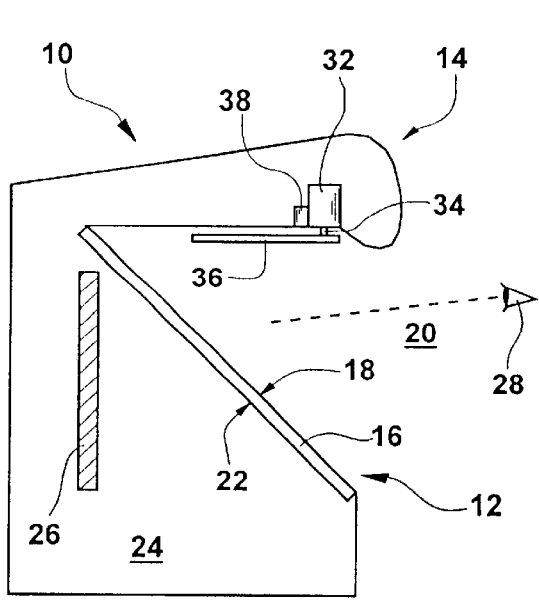
FIG. 1 is a side elevational view, partly in section, of an instrument panel with an instrument gauge located under the dashboard brow and a background located behind a partially reflective combiner in the instrument panel.

Referring now to the drawings, wherein the showings are for purposes of illustrating several preferred embodiments of the subject invention only and not for purposes of limiting same, FIG. 1 shows a vehicle dashboard 10 including an instrument panel portion 12 and a brow portion 14 extending outwardly from the instrument panel. The panel 12 includes a screen or combiner 16 having a front side 18 facing the passenger compartment 20 of the vehicle and a rear side 22, the screen being angled acutely with respect to brow 14 and having a coating which reflects approximately percent of the light impinging thereon from front side 18, while allowing a substantial amount of light to pass through screen 16 from rear side 22 to front side 18. A space 24 is located on the rear side of screen 16 that can be used for housing various vehicle instrumentation. A light sheet 26 is mounted in space 24 so that it can be seen through screen 16 by a person in passenger compartment 20 from a viewing location 28. Light sheet 26 includes various markings 30 that can be of any type, but that are generally indicative of some vehicle condition, such as speed, level of fluids, etc. A gauge motor 32, such as the gauge motor shown and described in U.S. Pat. No. 5,686,832 and available from Invotronics Manufacturing of Lapeer, Mich., is mounted in brow 14 and includes a rotary output shaft 34 to which a pointer 36 is attached. Sensors for sensing vehicle conditions (not shown) are connected to gauge motor 32 in a well known manner for causing pointer to assume different orientations corresponding to the different signals received from the sensor. Pointer 36 cannot be seen directly from viewing location 28, but a reflection 36' of the pointer 36 can be seen in partially reflective screen 16. Pointer 36 and light sheet 26 are arranged so that from viewing location 28, the reflected image 36' of pointer 36 appears superimposed over light sheet 26 and its markings. By properly controlling gauge motor 32, the image of pointer 36 can be made to point to appropriate markings 30 on light sheet 26 to convey information about vehicle condition to a person viewing screen 16 from viewing location 28. Pointer 36 further includes a light source 38 for illuminating the pointer to make it visible in screen 16.

Figure 12:
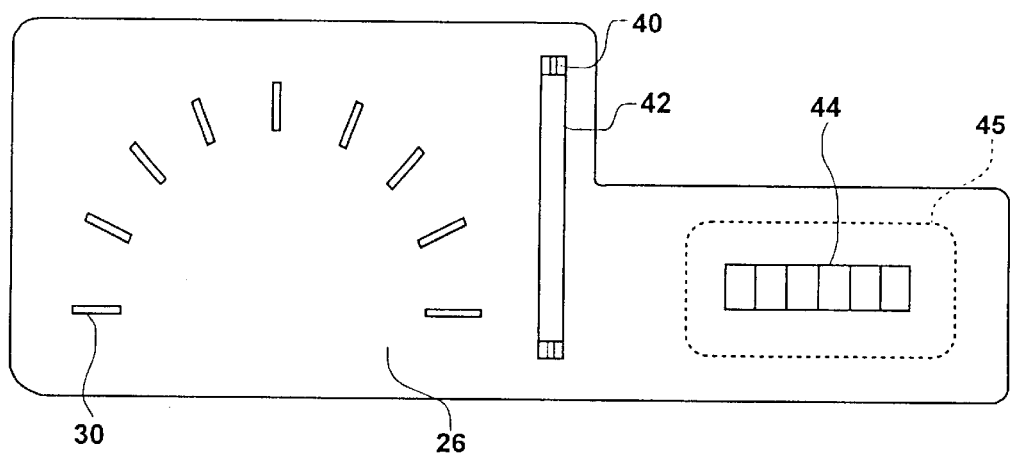
FIG. 12 is a front elevational view of a light sheet for use in connection with subject invention.
Figure 13:
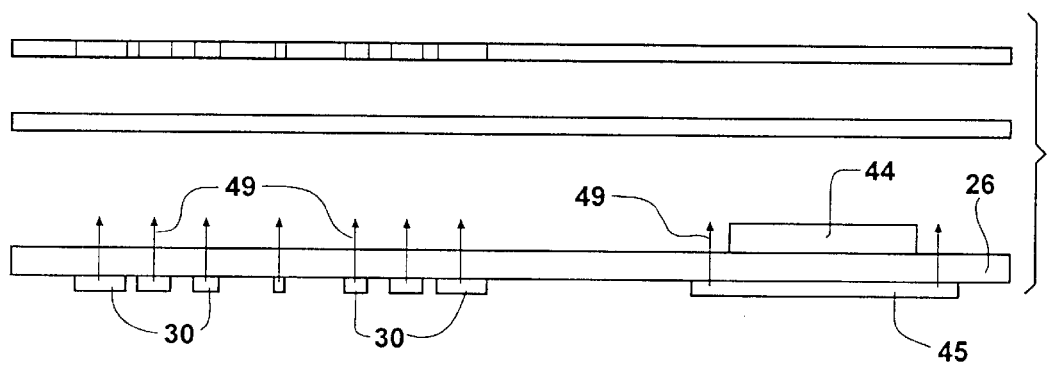
FIG. 13 is an exploded side elevational view of the light sheet of FIG. 12.

Light sheet 26 is shown in detail in FIGS. 12 and 13. The light sheet is formed from a sheet of transparent material such as acrylic or polycarbonate and includes a recess 40 for receiving a light source such as fluorescent light bulb 42. Bulb 42 projects light into the interior of the light sheet, which light exits the light sheet wherever markings 30 are located, as shown by arrows 49 in FIG. 13. An auxiliary display 44 may also be mounted in light sheet 26, and white printing or painting 45 around display 44 causes light to be emitted from the sheet in this region, thereby illuminating the auxiliary display. FIG. 13 shows a frosted applique 46 that may be placed over light sheet 26 to improve its appearance and that may include black ink markings 48 for better defining the outlines of white markings 30. Optionally, a colored sheet 50 may be inserted between the applique and light sheet in order to change the background color of the display. This colored sheet would be relatively easy to install and could be changed quickly by a dealer or even the vehicle owner in a matter of minutes when a different instrument panel appearance is desired.

Figure 14:
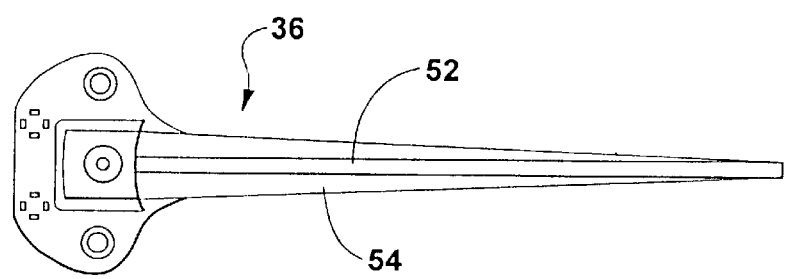
FIG. 14 is a top plan view of a pointer for use in the subject invention.
Figure 15:
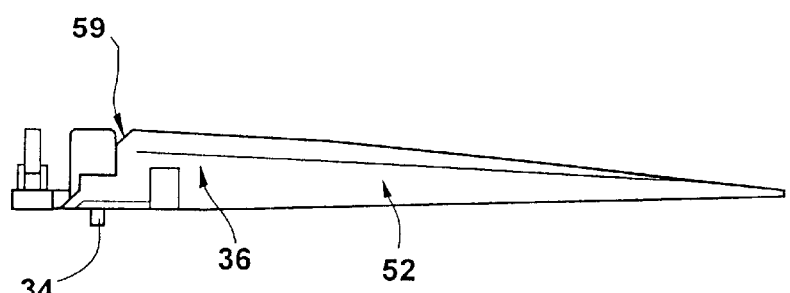
FIG. 15 is a side elevational view of the pointer of FIG. 14.
Figure 16:
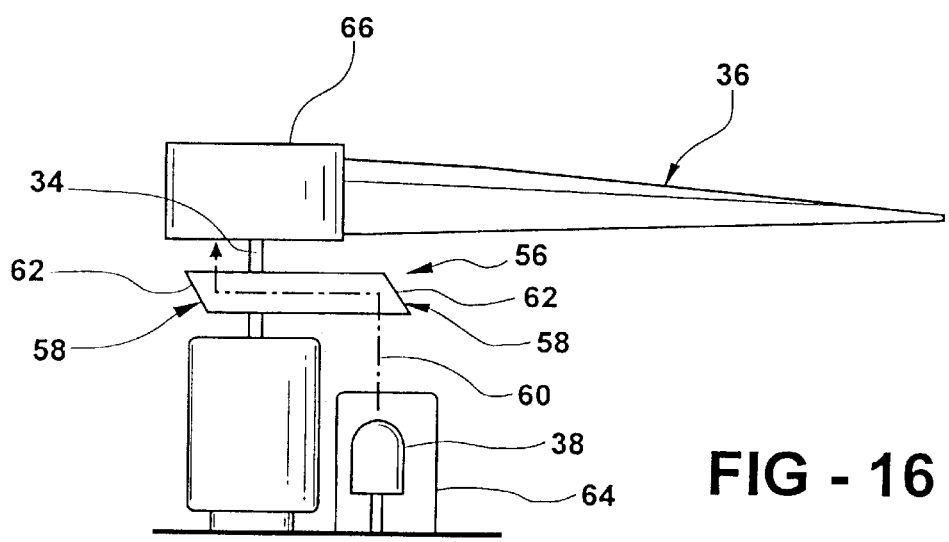
FIG. 16 is a side elevational view schematically showing a pointer for use in the subject invention and a light source for illuminating that pointer.

FIGS. 14–16 show a pointer for use in connection with the invention. A pointer having many desirable characteristics is shown and described in U.S. Pat. No. 5,703,612, and this patent is hereby incorporated by reference. In order to make all portions of the instrument display highly visible, it is important that pointer 36 be brightly lit, and that this light be concentrated on the pointer itself. This is accomplished by coating the outside of the pointer with a reflective material, such as reflective tape 52, over its entire surface, leaving only a narrow opening 54 running the length of the pointer for light to escape. The reflective tape 52 helps reflect light back into the interior of the pointer to maximize the amount of light exiting from opening 54. In addition, the outside of the tape is painted black to absorb light from other sources to prevent that light from reflecting off the outside of the pointer.

FIG. 16 shows light source 38, pointer 36, and a tube 56 having a pair of reflective facets 58 at either end for guiding a beam of light 60 from the light source to one end of pointer 36. The outer surfaces of the two facets 58 are both coated with reflective tape 62 so as to direct as much light as possible to the pointer. In addition, a chimney 64 surrounds bulb 38 to better direct light toward tube 56. A cap 66, painted white on the inside to contain light and black on the outside to absorb ambient light, is also added to the portion of pointer 36 connected to rotary output shaft 34. Thus in operation, light beam 60 leaves bulb 38 and passes out of chimney 64 and into tube 56 where it encounters a light reflecting facet 58, the outer surface of which is coated with reflecting tape, and is reflected through tube 56 toward second facet 58. Light beam 60 reflects off second facet 58 and enters one end of pointer 36, reflects off an additional reflective facet 59 therein, and travels along the interior of the pointer, exiting only from narrow opening 54.

Figure 2:
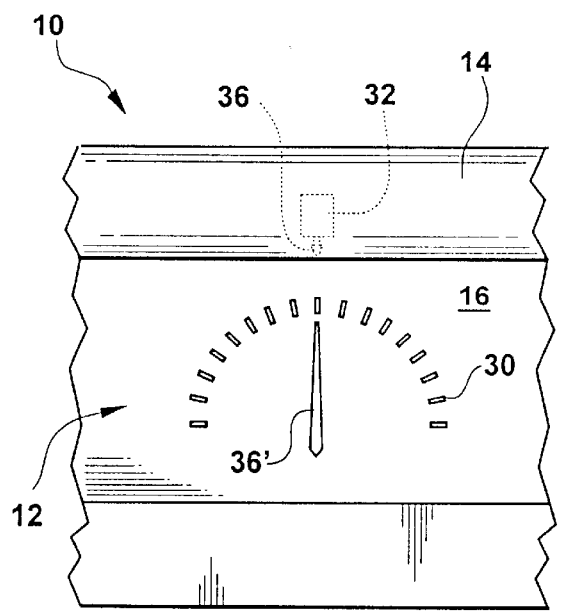
FIG. 2 is a front elevational view of the instrument panel of FIG. 1.
Figure 3:
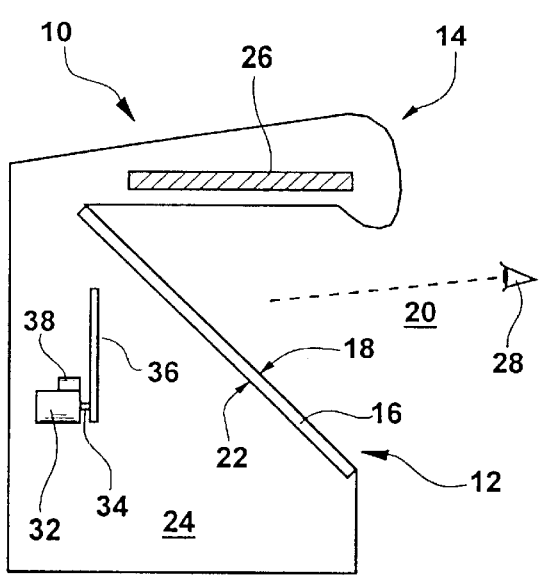
FIG. 3 is a side elevational view, partly in section of a second embodiment of the invention where the background display of an instrument is located under the dashboard brow and the instrument gauge is located behind a partially reflective combiner in the instrument panel.
Figure 4:
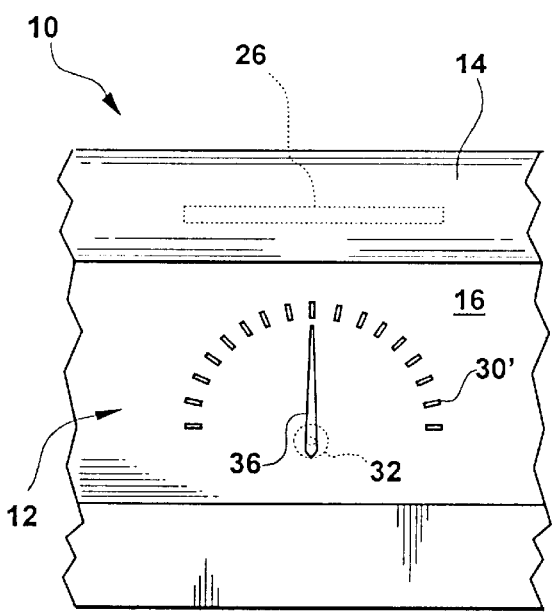
FIG. 4 is a front elevational view of the instrument panel of FIG. 3.

Referring now to FIG. 3, a second embodiment of the invention is disclosed wherein elements common to the first embodiment are identified with the same reference numerals used in FIGS. 1 and 2. FIG. 3 shows an arrangement essentially similar to that of FIGS. 1 and 2 except that light sheet 26 is housed in brow 14 and pointer 36 and gauge motor 32 are located behind screen 16 in space 24. An image of light sheet 26 is reflected off screen 16. From viewing location 28 lighted pointer 36 can be seen behind screen 16 and an image of light sheet 26 is reflected off screen 16 so that the pointer 36 and background display and reflected markings 30' on light sheet 26 appear to be part of a single instrument, as seen in FIG. 4.

Figure 5:
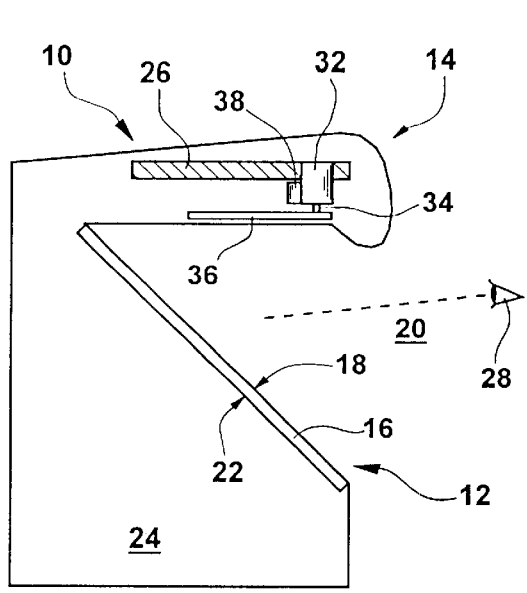
FIG. 5 is a side elevational view, partly in section, of a third embodiment of the invention where an instrument is located entirely under the brow of a dashboard and visible to a driver as a reflection in a partially reflective combiner in the instrument panel.
Figure 6:
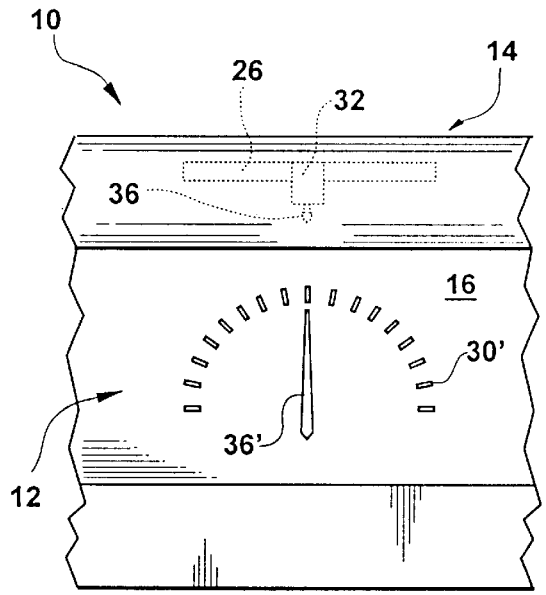
FIG. 6 is a front elevational view of the instrument panel of FIG. 5.

A third embodiment of the invention is shown in FIGS. 5 and 6. In this embodiment, both the light sheet 26 and pointer 36 are located in brow 14 of the dashboard, and the image of the instrument formed by these elements reflects off partially reflective screen 16 and is visible to a person at viewing location 28. Because screen 16 is only partially reflective and is not a fully reflective mirror, the image seen from viewing location 28 appears to be suspended in space much the same was the images in the first two embodiments appeared. This embodiment removes all elements of a particular instrument from behind screen 16, making a substantial amount of room available for other components of the vehicle.

Figure 7:
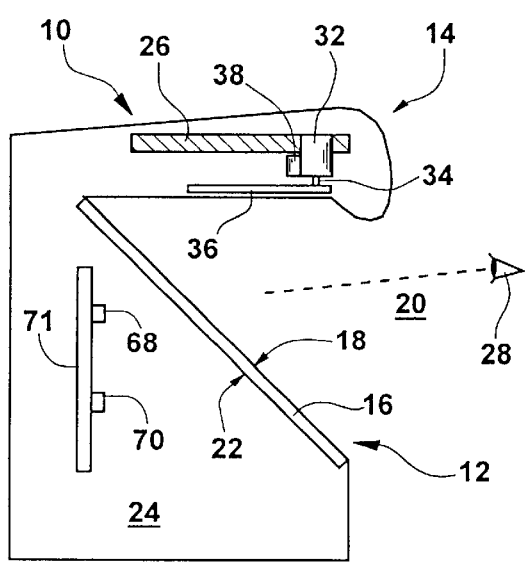
FIG. 7 is a side elevational view, partly in section of the instrument panel of FIG. 5 including a second instrument located behind the partially reflective combiner in the vehicle instrument panel.
Figure 8:
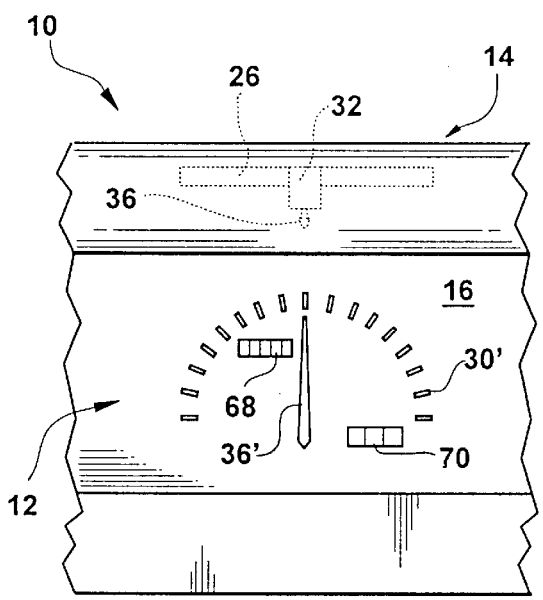
FIG. 8 is a front elevational view of the instrument panel of FIG. 7.

Optionally in this embodiment, additional instruments can be located behind screen 16, such as odometer 68 and trip odometer 70 mounted on a second light sheet 71 shown in FIGS. 7 and 8. Using prior art instrument panels, it would have been impractical to position an odometer this close to the gauge mechanism of an instrument without interfering with the operational parts of the gauge. However, using the subject invention, because the gauge is not physically located behind screen 16, the image of the instrument mounted in the brow can be superimposed on the instruments physically located behind the brow. This allows for additional flexibility in instrument panel design that was heretofore not available.

A fourth embodiment of the subject invention is shown in FIGS. 9–11. In this embodiment, an instrument is located in space 24 behind partially reflective screen 16, with no instruments or instrument elements mounted in the brow. Screen 16 serves as a dead front lens, making the instrument behind the screen invisible when light sheet 26 is not illuminated. When the light sheet is illuminated, the pointer and markings 30 on light sheet 26 appear to float in space because their images are being transmitted through screen 16 and this creates an appearance similar to that provided using the previous embodiments, but at a fraction of the cost. The pointer may also be angle away from the plane of light sheet 26 in order to provide a greater floating or three dimensional effect. In this manner, an inexpensive arrangement can be used to provide an easy-to-read display that appears similar to more complex arrangements described above.

The present invention has been described in terms of several preferred embodiments, it being understood that obvious modifications and additions to the invention will become apparent to those skilled in the relevant art upon a reading and understanding of this specification. For example, different combinations of instruments and instrument elements could be placed behind screen 16 or in brow 14 to form additional instrument panels, or the instruments could be broken up into different combinations of elements. For example, it might be desirable to place certain graphics on light sheet behind the partially reflective screen and other graphics in brow 14 so that the graphics could combine to form a three dimensional appearance. It is Applicant's intent that all such obvious modifications be included within this application to the extent that they are described by the several claims appended hereto.

What is claimed:

1. An instrument panel viewable from a viewing location comprising:

a screen portion for displaying information, said screen portion having an upper edge and a lower edge and further comprising a partially reflective combiner having a front surface facing said viewing location;

a brow portion extending outwardly from said upper edge of said screen portion;

a first illuminated display element positioned behind said combiner;

a second illuminated display element mounted in said brow so that the reflection of said second illuminated display element is visible in said combiner from said viewing location superimposed on said first illuminated display element to form an image of a virtual instrument, said second illuminated display element including a gauge motor having a rotary output shaft extending out from said gauge motor downwardly toward said combiner and a pointer mounted on said rotary output shaft;

a sensor for sensing a vehicle condition, said sensor generating and transmitting a signal; and a controller for controlling one of said first and second display elements in response to said signal received from said sensor so that said virtual instrument displays information on said vehicle condition.

2. The instrument of claim 1 wherein said first illuminated display element comprises a background display bearing markings indicative of a vehicle condition.

3. The instrument of claim 2 wherein said first illuminated display element comprises a light sheet and a light source mounted in proximity to said light sheet.

4. The instrument of claim 3 wherein said second illuminated display element comprises a pointer light source directing light into said pointer and wherein said pointer includes a first light-emitting portion and is masked to substantially prevent light from escaping except along said first light-emitting portion.

5. An instrument panel viewable from a viewing location comprising:

a screen portion for displaying information, said screen portion having an upper edge and a lower edge and further comprising a partially reflective combiner having a front surface facing the viewing location;

a brow portion extending outwardly from said upper edge of said screen portion;

a first illuminated instrument mounted behind said combiner for displaying information concerning a first vehicle condition;

a second illuminated instrument for displaying information concerning a second vehicle condition and mounted in said brow so that an image of said second instrument is visible in said combiner, said image appearing proximate to said first instrument from said viewing location, wherein the first illuminated instrument and the second illuminated instrument are disposed at an angle of about 90° relative to one another;

a first sensor for sensing said first vehicle condition, said first sensor generating and transmitting a first signal;

a second sensor for sensing said second vehicle condition, said second sensor generating and transmitting a second signal; and a controller for controlling said first instrument in response to said first signal received from said first sensor and for controlling said second instrument in response to said first signal received from said first sensor and for controlling said second instrument in response to said second signal received from said second sensor.

6. The instrument of claim 5 wherein said first illuminated instrument comprises a light sheet and a light source mounted in proximity to said light sheet.

7. The instrument of claim 5 wherein said second illuminated instrument comprises a light sheet and a light source mounted in proximity to said light sheet.

8. The instrument of claim 6 wherein said second illuminated instrument comprises a pointer light source directing light into said pointer and wherein said pointer includes a first light-emitting portion and is masked to substantially prevent light from escaping except along said first light-emitting portion.

9. The instrument of claim 5 wherein said second illuminated instrument includes a gauge motor having a rotary output shaft extending coaxially with said gauge motor and downwardly toward said combiner and a pointer mounted on said rotary output shaft.

10. The instrument of claim 9 wherein said second illuminated instrument comprises a pointer light source directing light into said pointer and wherein said pointer includes a first light-emitting portion and is masked to substantially prevent light from escaping except along said first light-emitting portion.

11. An instrument panel viewable from a viewing location comprising:

a screen portion for displaying information, said screen portion having an upper edge and a lower edge and further comprising a partially reflective portion;

a brow portion extending outwardly from said upper edge of said screen portion;

an illuminated instrument for displaying information concerning a vehicle condition, said instrument comprising a first illuminated display element and a second illuminated display element, the first illuminated display element including a light sheet bearing markings indicative of the vehicle condition and a light source mounted in proximity to said light sheet and the second illuminated display element comprising a gauge motor having a rotary output shaft extending directly out from said gauge motor downwardly toward said screen portion and a pointer mounted on said rotary output shaft, wherein said first and second display elements are mounted in said brow portion so that reflections of said first and second display elements are visible in said screen portion from the viewing location, the reflections of said first and second display elements being superimposed in said screen portion so as to form an image of the instrument viewable from said viewing location;

a sensor for sensing said vehicle condition, said sensor generating and transmitting a signal; and a controller for controlling said gauge motor in response to said signals received from said sensor.

* * * * *

UNITED STATES PATENT AND TRADEMARK OFFICE
CERTIFICATE OF CORRECTION

PATENT NO. : 6,317,037 B1  Page 1 of 1
DATED : November 13, 2001
INVENTOR(S) : Ayres et al.

It is certified that error appears in the above-identified patent and that said Letters Patent is hereby corrected as shown below:

Column 4,
Line 31, please insert -- 30 -- before "percent".

Signed and Sealed this

Seventh Day of May, 2002

Attest:

JAMES E. ROGAN
Attesting Officer  Director of the United States Patent and Trademark Office